(12) United States Patent
Geerlings et al.

(10) Patent No.: US 10,964,138 B2
(45) Date of Patent: Mar. 30, 2021

(54) SYSTEM AND METHOD FOR SECURE PACKAGE DELIVERY

(71) Applicant: GENTEX CORPORATION, Zeeland, MI (US)

(72) Inventors: Steven L. Geerlings, Holland, MI (US); Thomas D. Klaver, Ada, MI (US); Thomas S. Wright, Holland, MI (US); Todd R. Witkowski, Zeeland, MI (US); Matthew W. Chiodo, Farmington Hills, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/734,452

(22) Filed: Jan. 6, 2020

(65) Prior Publication Data

US 2020/0219340 A1  Jul. 9, 2020

Related U.S. Application Data

(60) Provisional application No. 62/789,185, filed on Jan. 7, 2019.

(51) Int. Cl.
| | | |
|---|---|---|
| *G05B 19/00* | (2006.01) |
| *G05B 23/00* | (2006.01) |
| *G06F 7/00* | (2006.01) |
| *G06F 7/04* | (2006.01) |
| *G08B 29/00* | (2006.01) |
| *G08C 19/00* | (2006.01) |
| *H04B 1/00* | (2006.01) |
| *H04B 3/00* | (2006.01) |
| *H04L 9/32* | (2006.01) |
| *H04Q 1/00* | (2006.01) |
| *H04Q 9/00* | (2006.01) |
| *G07C 9/00* | (2020.01) |

(Continued)

(52) U.S. Cl.
CPC .......... *G07C 9/00182* (2013.01); *E05F 15/77* (2015.01); *G06Q 10/0832* (2013.01); *G08C 17/02* (2013.01); *E05Y 2900/106* (2013.01)

(58) Field of Classification Search
CPC . G07C 9/00182; E05F 15/77; G06Q 10/0832; G08C 17/02; E05Y 2900/106
USPC ........................................................ 340/5.74
See application file for complete search history.

(56) References Cited

U.S. PATENT DOCUMENTS 10,474,980 B1 * 11/2019 McCalib, Jr. .......... H04N 7/181
10,627,244 B1 *  4/2020 Lauka ................ G06Q 10/0833
(Continued)

OTHER PUBLICATIONS

International Search Report dated Apr. 9, 2020 for corresponding PCT Application PCT/US2020/102295, 3 Pages.
(Continued)

*Primary Examiner* — Tanmay K Shah
(74) *Attorney, Agent, or Firm* — Price Heneveld LLP; Bradley D. Johnson (57) ABSTRACT

A system is provided for allowing temporary access to a desired area. The temporary access may be for the purposes of making a delivery. The system comprises a trainable transceiver configured to transmit an activation signal to a remote device; a mobile communications device in selective communication with the trainable transceiver; and an accessory selectively securable to mobile communications device and capable of transmitting information to trainable transceiver.

14 Claims, 7 Drawing Sheets

(51) Int. Cl.
*E05F 15/77* (2015.01)
*G06Q 10/08* (2012.01)
*G08C 17/02* (2006.01)

(56) References Cited

U.S. PATENT DOCUMENTS

| | | |
|---|---|---|
| 2001/0050615 A1 | 12/2001 | Kucharczyk |
| 2002/0099945 A1 | 7/2002 | McLintock |
| 2018/0008310 A1* | 1/2018 | Butler ................ A61B 17/3423 |
| 2018/0075681 A1* | 3/2018 | Scalisi .............. G07C 9/00896 |
| 2018/0158265 A1* | 6/2018 | Lyman .................... G07C 9/20 |
| 2018/0268633 A1* | 9/2018 | Kwon ................ G07C 9/00309 |
| 2019/0087775 A1* | 3/2019 | Buehre .............. G06Q 10/0833 |

OTHER PUBLICATIONS

Written Opinion dated Apr. 9, 2020 for corresponding PCT Application PCT/US2020/012295, 5 Pages.

\* cited by examiner

SYSTEM AND METHOD FOR SECURE PACKAGE DELIVERY

CROSS REFERENCE TO RELATED APPLICATIONS

This application claims the benefit of and priority to U.S. Provisional Patent Application No. 62/789,185, filed on Jan. 7, 2019, entitled System and Method for Secure Package Delivery, the entire disclosure of which is hereby incorporated herein by reference.

FIELD OF THE DISCLOSURE

This disclosure relates generally to systems and methods of providing access to an area, and more particularly, systems and methods for providing temporary secure access to an area.

BACKGROUND

The proliferation of online shopping has led to an increase in package theft, and while several solutions have been developed for thwarting so-called "porch pirates," these all have drawbacks. Furthermore, most of these solutions do not address another issue—packages being left exposed to the elements. One such solution is to provide a numeric keypad that unlocks a door of the building so the delivery driver with the numeric code may unlock the door. Although this removes the packages from exposure to the elements, it may allow delivery drivers to have access to the inside of the building.

SUMMARY

According to one aspect of the present disclosure, a system for allowing access may comprise a trainable transceiver configured to transmit an activation signal to a remote device; a mobile communications device in selective communication with the trainable transceiver; and an accessory selectively securable to mobile communications device and capable of transmitting information to trainable transceiver.

The information may comprise an activation signal. The activation signal may be capable of activating the remote device, and activating the remote device may cause the remote device to open a moveable access barrier. The information may give the trainable transceiver permission to transmit an activation signal to the remote device; and activating the remote device may cause the remote device to open a moveable access barrier. The mobile communications device may be capable of scanning a bar code and transmitting information related to the bar code to the accessory. The system further may comprise a remote server in communication with the trainable transceiver and the mobile communications device; and the information may be stored in the remote server. The information may be stored in one of the mobile communications device and the accessory. The system further may comprise a program disposed on mobile communications device and operable to determine whether: the system has a stored activation signal for the remote device, and whether the system has permission to use the activation signal for the remote device. The accessory may comprise a display element; and the accessory may be configured to display messages on the display element.

According to another aspect, a method of making deliveries may comprise arriving at a delivery address; scanning, with a mobile communications device, a bar code on an item to be delivered; determining, by a program associated with the mobile communications device, whether secure access may be available for the delivery; transmitting, by an accessory in communication with the mobile communications device, information to a trainable transceiver; and transmitting, by the trainable transceiver, an activation signal to a remote device configured to open a moveable access barrier upon receipt of the activation signal; wherein the activation signal may be uniquely associated with the remote device.

The method further may comprise displaying, on a display element of the accessory, at least one of a message about the availability of secure access and a request for a user input. The method further may comprise transmitting, by the trainable transceiver, an activation signal to the remote device. The activation signal may cause the remote device to close the moveable access barrier.

According to another aspect, a system for allowing access may comprise a trainable transceiver configured to transmit an activation signal to a remote device; a mobile communications device in selective communication with the trainable transceiver; an accessory selectively securable to mobile communications device and capable of transmitting information to trainable transceiver; a moveable access barrier capable of being remotely operated; and a remote device configured to control the moveable access barrier.

According to another aspect, a system for allowing access to a desired area where access to the desired area may be through a remotely-controllable moveable access barrier, may comprise a remote device that allows access into the desired area in response to an activation signal uniquely associated with the remote device; a remote server configured to store characteristics of the activation signal; a trainable transceiver comprising a local memory; an interface through which communication with the remote server may be provided; a controller in communication with the local memory and the interface, the controller configured to receive the activation signal from the remote server through the interface and to store the activation signal in the local memory; and a transceiver configured to transmit the activation signal to the remote device where the transmitted activation signal includes signal characteristics stored in the local memory; wherein the activation signal may not be received until the trainable transceiver may be within a first predetermined distance from the desired area.

The controller may be configured to erase the activation signal from the local memory when the trainable transceiver may be more than a second predetermined distance from the desired area. The controller may be configured to erase the activation signal from the local memory at a predetermined time after initially transmitting the activation signal to the remote device. The remote device may be a garage door opener, the moveable access barrier may be a garage door capable of being opened and closed by the garage door opener, the remote device may be configured to open and close the garage door; and the garage door opener may allow access through the garage door by opening the garage door in response to receiving an activation signal having characteristics uniquely associated with the garage door opener.

According to another aspect, a system for allowing temporary access to a desired area, where access to the desired area may be through a remotely-controllable moveable access barrier, may comprise: a remote device that allows access through the moveable access barrier in response to an activation signal having characteristics uniquely associated with the remote device; a remote server configured to store the activation signal; a trainable transceiver comprising a local memory; an interface through which communication with the remote server may be provided; a controller in communication with the local memory and the interface, the controller configured to receive the activation signal from the remote server through the interface and to store characteristics of the activation signal in the local memory; and a trainable transceiver configured to transmit the activation signal to the remote device in an operating mode where the transmitted activation signal includes the activation signal characteristics stored in the local memory. The activation signal characteristics may not be received from the remote server until a beginning of an estimated delivery time window.

The controller may erase the activation signal from the local memory at an end of the estimated delivery time window. The remote device may be a garage door opener and the moveable access barrier may be a garage door that may be opened and closed by the garage door opener; and the garage door opener may allow access through the garage door by opening the garage door in response to an activation signal having characteristics uniquely associated with the garage door opener.

According to another aspect, a system for allowing temporary access to a desired area, where access to the desired area may be through a remotely-controllable moveable access barrier, may comprise: a remote device that allows access through the moveable access barrier in response to an activation signal having characteristics uniquely associated with the remote device; a control device located in proximity to the desired area for transferring the activation signal to the remote device to allow access through the moveable access barrier in response to the receipt of an activation signal, the activation signal having an identification code uniquely associated with a particular delivery; a remote server configured to store the identification code; a trainable transceiver comprising a local memory; an interface through which communication with the remote server may be provided; a controller in communication with the local memory and the interface, the controller configured to receive the identification code from the remote server through the interface and to store the identification code in the local memory; and a trainable transceiver configured to transmit the activation signal to the remote device where the transmitted activation signal includes the identification code stored in the local memory.

The identification code may be received only after the trainable transceiver may be within a first predetermined distance from the desired area. The controller may be configured to erase the identification code from the local memory when the trainable transceiver may be more than a second predetermined distance from the desired area. The controller may be configured to erase the identification code from the local memory at a predetermined time after initially transmitting the activation signal to the control device. The remote device may be a garage door opener and the moveable access barrier may be a garage door that may be opened and closed by the garage door opener; and the garage door opener may be configured to allow access through the garage door by opening the garage door in response to an activation signal having characteristics uniquely associated with the garage door opener. The control device may include a camera capable of capturing images.

According to another aspect, a system for allowing temporary access to a desired area, where access to the desired area may be through a remotely-controllable moveable access barrier, may comprise: a remote device that allows access through the moveable access barrier in response to an activation signal having characteristics uniquely associated with the remote device; a control device located in proximity to the desired area for transmitting the activation signal to the remote device to allows access through the moveable access barrier in response to entry by a user of a passcode; and a remote server configured to store the passcode; wherein the control device may be in communication with the remote server so as to temporarily download the passcode and store the passcode in a local memory. The passcode may be downloaded and stored in the local memory during an estimated delivery time window. The passcode may be associated with a particular delivery to be made to the desired area.

These and other features, advantages, and objects of the present invention will be further understood and appreciated by those skilled in the art by reference to the following specification, claims, and appended drawings.

DETAILED DESCRIPTION

The systems and methods described herein pertain to secure delivery of items to a delivery address. They may allow a person making a delivery to temporarily access a garage or other desired area of a home, business, or other establishment, where access to the desired area is restricted by a moveable access barrier capable of being remotely-controlled. In some embodiments, the secure delivery system may allow access to the desired area without also giving access to undesired areas such as the inside of the home or business.

In some embodiments, the use of a secure delivery system may allow someone other than a recipient of a delivery to access a desired area associated with the recipient without the recipient being present. The access to the desired area may be accomplished through an account associated with the recipient that may be accessed by, for example, a delivery service or a vendor. For example, a delivery recipient may order supplies from a vendor online. The recipient may have an account with the vendor. The vendor's delivery personnel and/or vehicles may be able to temporarily control a remote device that controls access to the recipient's desired area, thereby allowing secure deliveries to the desired area. In another example, a delivery may be going through a delivery service to recipient's address. If recipient has enrolled his or her address with the delivery service, the delivery service's personnel or vehicle may allow access to recipient's desired area.

Figure 1:
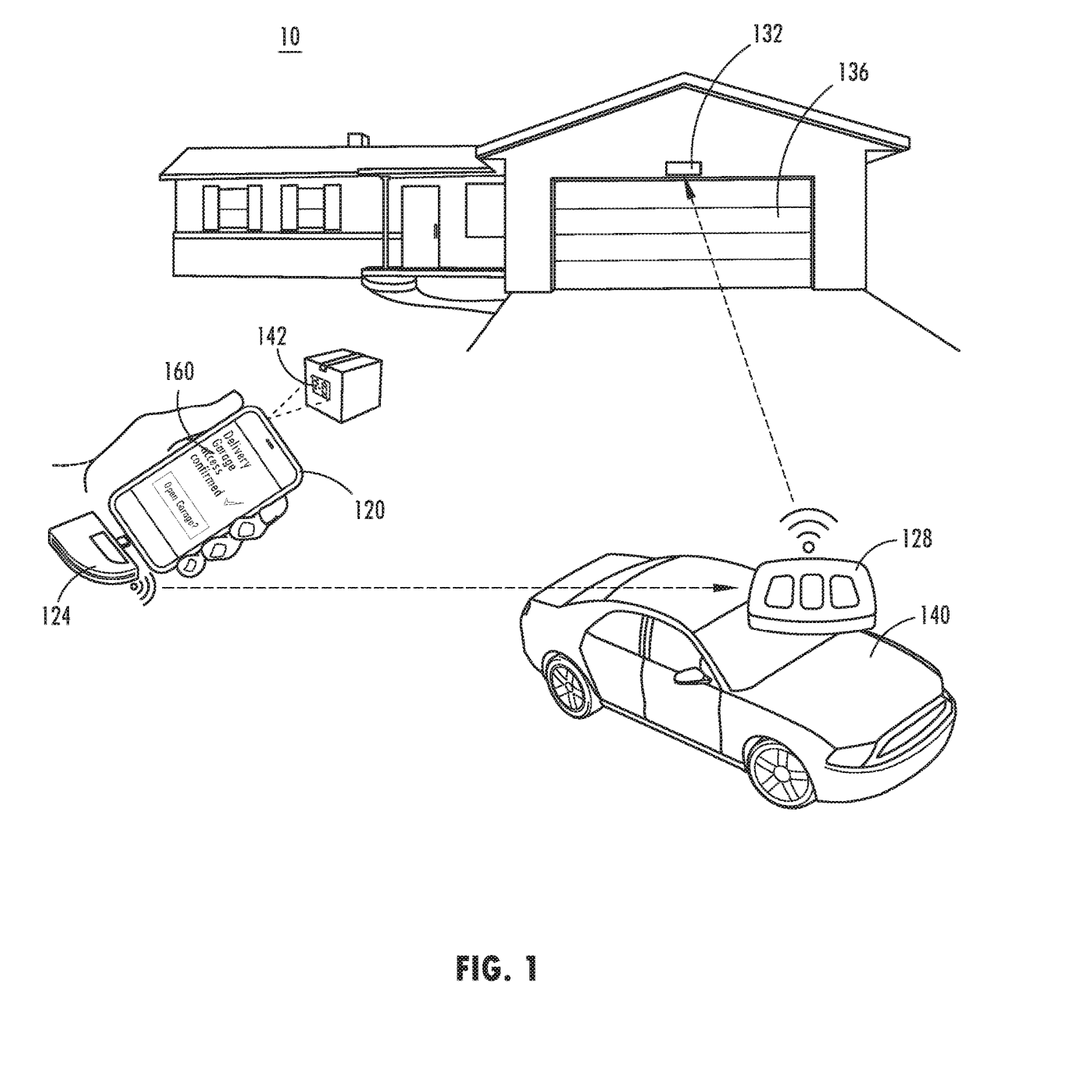
FIG. 1 illustrates a diagram of the components of an embodiment of a secure delivery system in accordance with this disclosure.

In some embodiments, as shown in FIG. 1, a secure delivery system, generally indicated at 10, may comprise at least one mobile communications device 120 such as a mobile phone or a tablet, at least one accessory 124 removably securable to and configured to selectively communicate with mobile communications device 120, and at least one trainable transceiver 128 capable of controlling at least one remote device 132.

Figure 2A:
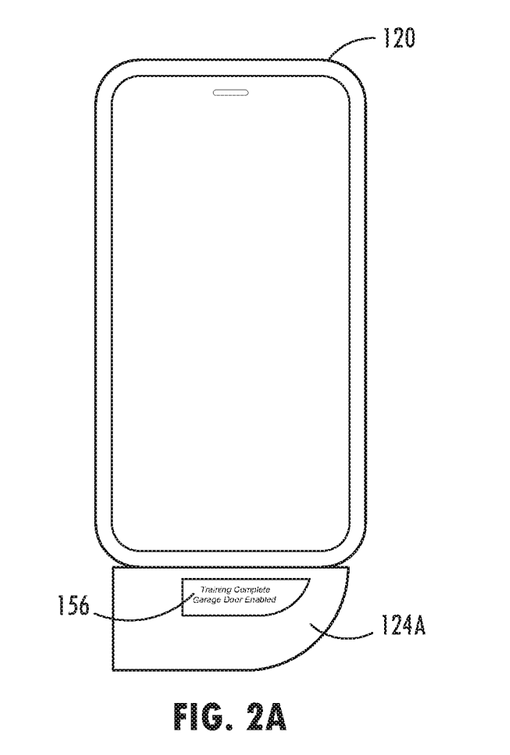
FIG. 2A illustrates a first embodiment of an accessory to be attached to a mobile communications device in accordance with the method of FIG. 1.
Figure 2B:
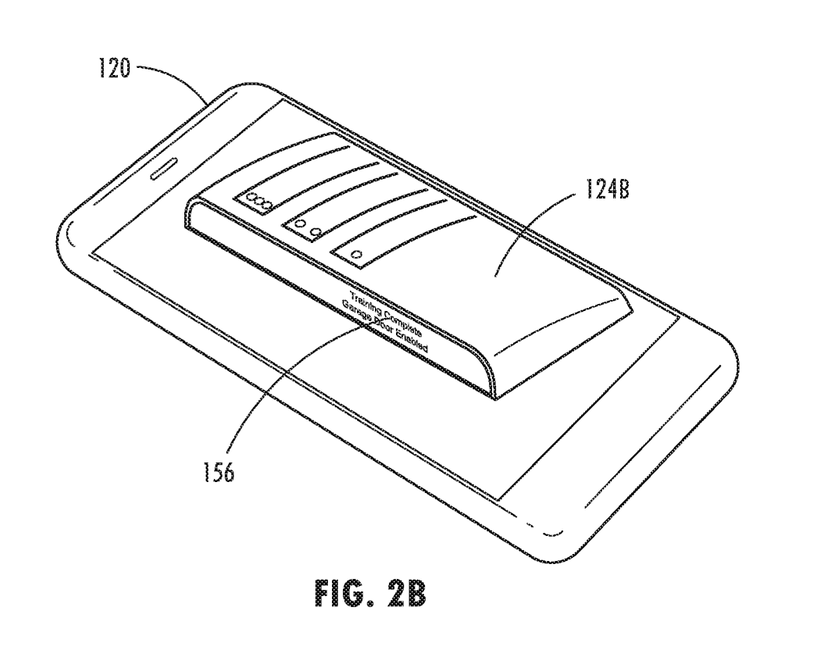
FIG. 2B illustrates a second embodiment of an accessory to be attached to a mobile communications device in accordance with the method of FIG. 1.

Accessory 124 may comprise, for example, a dongle 124A configured to plug into an open port on mobile communications device 120, either with a cord or through a direct connection, as shown in FIG. 2A. In another example, accessory 124 may comprise a device 124B configured to be removably securable to a surface of mobile communications device 120 as shown in FIG. 2B. Accessory 124 may be configured to communicate with mobile communications device 120 through a hard-wired connection or wirelessly, such as through Bluetooth® low energy (BLE), WiFi, near field communication (NFC), radio frequency identification (RFID), cellular communications, and the like. In some embodiments, accessory 124 may further comprise a display element 156 configured to display information to a user.

Remote device 132 may be configured to operate a remotely-controlled moveable access barrier 136 upon the receipt of appropriate instructions. Moveable access barrier 136 may comprise, for example, an electronically controlled garage door, security gate, boom barrier, and the like. Remote device 132 may comprise a device such as a garage door opener, a gate opener, or other device configured to receive activation signals and to control moveable access barrier 136, including opening and closing moveable access barrier 136, upon the receipt of appropriate activation signals. Remote device 132 and moveable access barrier 136 may be associated with a residence, a business, a government building, or other location.

Generally, trainable transceiver 128 may be configured to control one or more remote devices 132. Trainable transceiver 128 may be configured to transmit activation signals to remote device 132, either wired or wirelessly. In some embodiments, the activation signal may be transmitted, for example, over the internet or may be a radio frequency (RF) signal. The activation signal may be configured to trigger the activation of remote device 132, thereby causing the opening or closing of moveable access barrier 136. The activation signal may include parameters such as frequency or frequencies of transmission (e.g., channels), encryption information (e.g., a rolling code, fixed code, or other information related to an encryption technique), identification information (e.g., a serial number, make, model or other information identifying a remote device 132 and/or other device), and/or other information related to formatting an activation signal to control remote device 132. Trainable transceiver 128 may be capable of learning characteristics of the activation signal that include not only the carrier frequency, data code and modulation, but also any characteristics needed to learn and generate a rolling code.

In some embodiments, trainable transceiver 128 may be located in a vehicle 140 that is being used for a delivery. Trainable transceiver 128 may be mounted to an interior element of vehicle 140. Trainable transceiver 128 may be used to allow the person making the delivery to have temporary access to the desired area by, upon receipt of appropriate input(s), providing activation instructions to remote device 132 controlling moveable access barrier 136.

In some embodiments, trainable transceiver 128 may comprise a user interface including at least one user input element 144, and may be configured to receive a user input. Trainable transceiver 128 may be configured to, for example, transmit an activation signal in response to the receipt of a user input. In some embodiments, user interface may further comprise a display element 146 configured to display data or messages to a user or otherwise provide outputs. For example, display element 146 of trainable transceiver 128 may be configured to display an alert when trainable transceiver has received permission to transmit an activation signal to remote device 132.

In some embodiments, to receive a secure delivery, it may be necessary for the recipient of the delivery to establish an account with the entity making the delivery. Secure delivery system 100 may be configured to grant temporary control of remote device 132 to a trainable transceiver 128 associated with a person or vehicle making a delivery, thereby allowing temporary access to the desired area. The item to be delivered or the delivery address may be linked to an account owned by the delivery recipient. The account may contain information about a remote device 132 associated with the account, including activation information. In some embodiments, a plurality of accounts may be associated with secure delivery system 100.

Figure 3A:
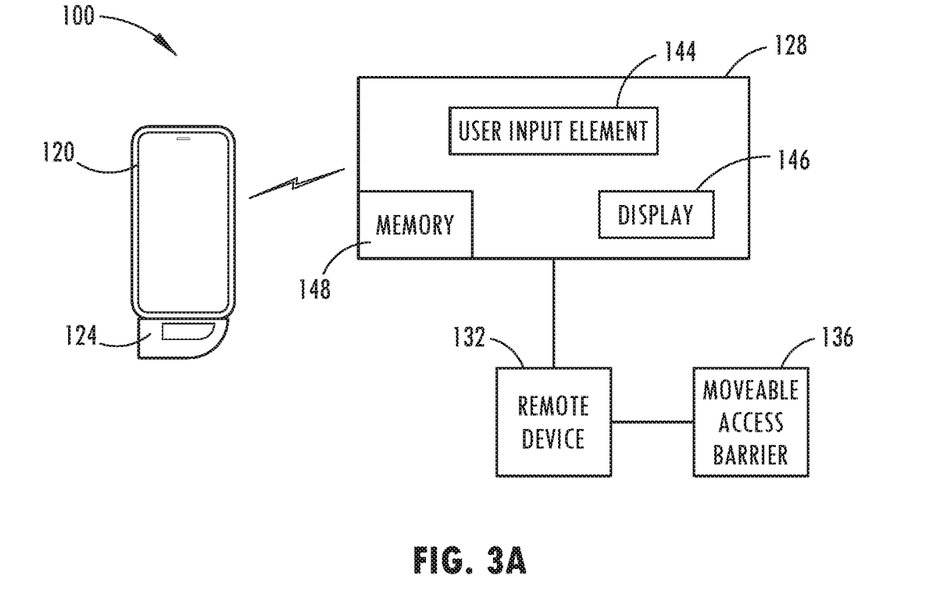
FIG. 3A illustrates a block diagram showing a first arrangement of the secure delivery system of FIG. 1.
Figure 3B:
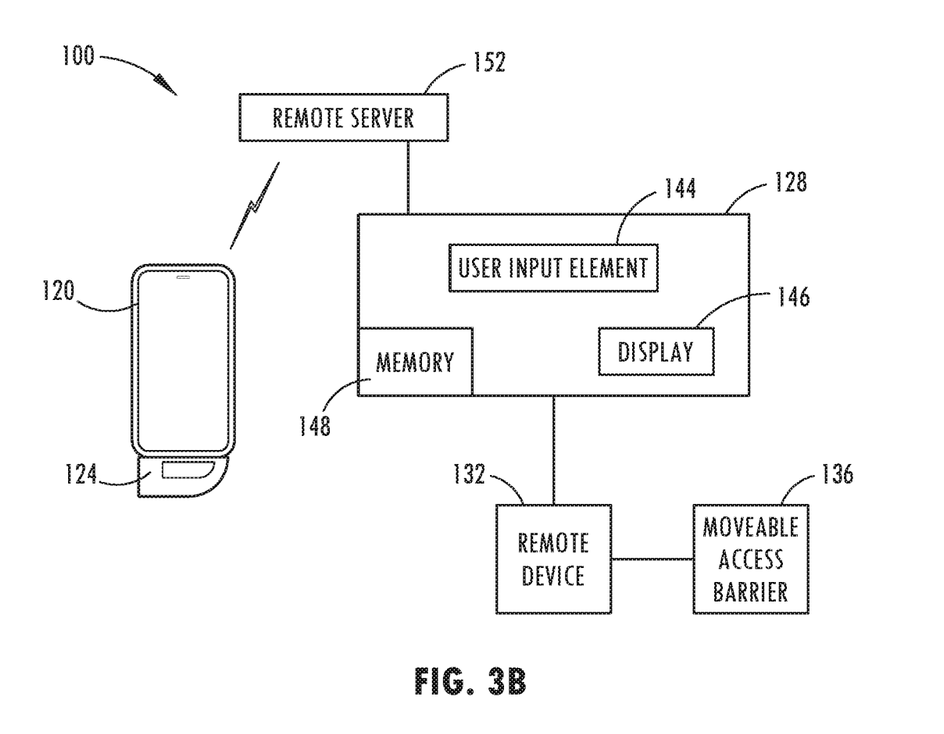
FIG. 3B illustrates a block diagram showing a second arrangement of the secure delivery system of FIG. 1.

As shown in FIG. 3A, in some embodiments, trainable transceiver 128 may comprise a memory 148, and at least one activation signal or characteristics of at least one activation signal may be stored in memory 148. As shown in FIG. 3B, in some embodiments, mobile communications device 120 may comprise or be in communication with a remote server or a cloud-based architecture, hereinafter referred to as remote server 152. At least one activation signal or characteristics of at least one activation signal may be stored in remote server 152. Each of the at least one activation signals or characteristics thereof may be linked to a recipient's account, and each account may be associated with at least one remote device 132. Remote server 152 may be in communication with one or more mobile communications devices 120. Communication between remote server 152 and the one or more mobile communications devices 120 may allow for the transmission of information stored on remote server 152, including information on at least one activation signal, to at least one mobile communications device and/or the transmission of information stored on one or more mobile communications devices 120 to remote server 152.

Upon receipt of an appropriate input, trainable transceiver 128 may be configured to transmit an activation signal to remote device 132. An appropriate input may comprise, for example, an input from accessory 124 or mobile communications device 120, an input from user input element 144, an input from remote server 152, or a combination of at least one of an input from accessory 124 or mobile communications device 120, an input from user input element 144, and an input from remote server 152. The input from accessory 124 or mobile communications device 120 or from remote server 152 may be transmitted to trainable transceiver 128 upon a determination that access to a particular desired area is allowed. The determination may be based on, for example, a recipient account being linked to the delivery address or a delivery being made to the delivery address during a particular window of time.

In some embodiments, once a determination has been made that access to the desired area is allowed, a user input may be required to transmit the activation signal. Upon receipt of the appropriate user input, trainable transceiver 128 may be configured to transmit the activation signal linked to the account. Upon receipt of the activation signal, remote device 132 may be configured to cause moveable access barrier 136 to open, thereby allowing access to the desired area for the delivery.

In some embodiments, secure delivery system 100 may be configured to allow secure access to a plurality of desired areas, and each desired area may be associated with a delivery recipient's account. Secure delivery system 100 may thus be configured to be linked to a plurality of accounts, each account containing information about at least one remote device 132 that controls access to a desired area. A unique activation signal may be linked to each remote device 132. Each activation signal may, upon being transmitted to a particular remote device 132 linked to the account, be configured to cause the particular remote device 132 to cause the associated moveable access barrier to move from a closed position to an open position or vice versa.

In some embodiments, secure delivery system may comprise a plurality of trainable transceivers 128 and a plurality of mobile communications devices 120, a plurality of accessories 124, each mobile communications device 120 capable of being in communication with one of the plurality of accessories 124. Each of the plurality of accessories 124 may be configured to transmit information to one or more trainable transceiver 128. Upon a determination that an item to be delivered is linked to a recipient's account that also is associated with an activation signal, accessory 124 may transmit information to a trainable transceiver 128 associated with secure delivery system. Upon receipt of the information, trainable transceiver 128 may be configured to transmit the appropriate activation signal for the particular remote device 132 associated with the recipient's account. The activation signal may be stored in trainable transceiver 128, in remote server 152, or in accessory 124. In response to the receipt of the activation signal, remote device 132 may cause moveable access barrier 136 to open. In some embodiments, trainable transceiver may be configured to provide feedback, such as providing a message on display element 146, once the activation signal has been transmitted.

In some embodiments, upon the receipt of a second input, trainable transceiver 128 may be configured to transmit a second activation signal. Upon the receipt of the second activation signal and/or upon the occurrence of a predetermined event, remote device 132 may be configured to cause moveable access barrier 136 to close. After moveable access barrier 132 has closed, trainable transceiver 128 may not be able to cause remote device 132 to transmit another activation signal to remote device 132 unless it receives another input from accessory allowing it to do so.

Prior to using secure delivery system 100 to allow access to the desired area, trainable transceiver 128 may need to be trained to operate remote device 132 and associated with the recipient's account. In some embodiments, the training may be performed by a user manually inputting activation information into trainable transceiver 128 to configure trainable transceiver 128 to control remote device 132. In some embodiments, trainable transceiver 128 may be capable of learning characteristics of the activation signal from a transmitter (not shown) configured to transmit an activation signal to remote device 132, the activation signal configured to activate remote device 132. The transmitter may comprise, for example, a transmitter originally sold with remote device 132.

In some embodiments, trainable transceiver 128 may be configured to receive an activation signal containing activation information from the transmitter and to store the activation information from the received signal. In some embodiments, trainable transceiver 128 may be capable of identifying a code type (e.g., rolling code or fixed code) of the activation signal based on message characteristics (e.g., bit sequence) of the activation signal. If trainable transceiver 128 determines that the code type of the activation signal is rolling code, trainable transceiver 128 may be configured to initiate and maintain a counter to keep track of the rolling code count.

Upon being trained to a particular remote device 132, secure delivery system 100 may store the activation signal for the remote device 132 either in memory 148 or in remote server 152. In some embodiments, trainable transceiver 128 may store in memory 148 one or more characteristics of the activation signal received from the transmitter. In some embodiments, one or more characteristics of the activation signal may be stored on remote server 152, and trainable transceiver 128 may be configured to access and retrieve the activation signal from remote server 152. Once trainable transceiver 128 has learned or obtained access to the activation signal characteristics, it may be capable of selectively transmitting a wireless signal containing the activation signal to remote device 132 upon the receipt of appropriate inputs.

In some embodiments, a scannable or computer-readable identifying graphic may be disposed on an item to be delivered. Identifying graphic 142 may comprise, for example, a Quick Response (QR) code, a linear barcode, and the like. Identifying graphic 142 may be linked to the delivery recipient's account, either directly to the owner's account or indirectly to the owner's account, for example via the address or location to which the delivery is to be made (the delivery address).

In some embodiments, a program may be stored either on mobile communications device 120 or on remote server 152 and accessible by mobile communications device 120. A user may access the program via mobile communications device 120, and may interact with the program through a user interface (not shown) on mobile communications device 120.

Mobile communications device 120 may be capable of scanning identifying graphic 142. The program in mobile communications device 120 may be configured to determine whether information encoded in identifying graphic 142 of the item to be delivered may be linked to the recipient's account in secure delivery system 100. Accessory 124 may be configured to transmit information to trainable transceiver 128 upon a determination that identifying graphic 142 is associated with a delivery recipient's account. Trainable transceiver 128 may be configured to retrieve, either from memory 148 or from remote server 152, the activation signal for the operation of the particular remote device 132 associated with the recipient's account, and to transmit the activation signal to the particular remote device 132. Remote device 132 may be configured to cause moveable access barrier 136 to open, thereby allowing access to the desired area. If trainable transceiver 128 determines that identifying graphic 142 is not linked to an activation signal, no activation signal is transmitted to remote device 132.

In some embodiments, trainable transceiver 128 may be capable of accessing the activation signal for the particular remote device 132 only if certain predetermined conditions are met. The predetermined conditions may include, for example, a determination by the program that identifying graphic 142 is linked to a recipient's account, the arrival of a predetermined time window, and the like.

In some embodiments, once the delivery has taken place, a user input to trainable transceiver 128 may be used to close moveable access barrier 136. In some embodiments, trainable transceiver 128 may automatically transmit an activation signal to remote device 132, upon the occurrence of a predetermined event, such as the passage of a predetermined amount of time, thereby causing the closing of moveable access barrier 136.

In some embodiments, once moveable access barrier 136 has been closed, trainable transceiver 128 may not be able to cause moveable access barrier to open again unless certain predetermined conditions are met. The predetermined conditions may include, for example, another delivery to the same delivery address.

In some embodiments, once a delivery has been completed, secure delivery system 100 may be configured to cause an alert to be generated and transmitted to the recipient that a delivery has taken place.

Figure 4:
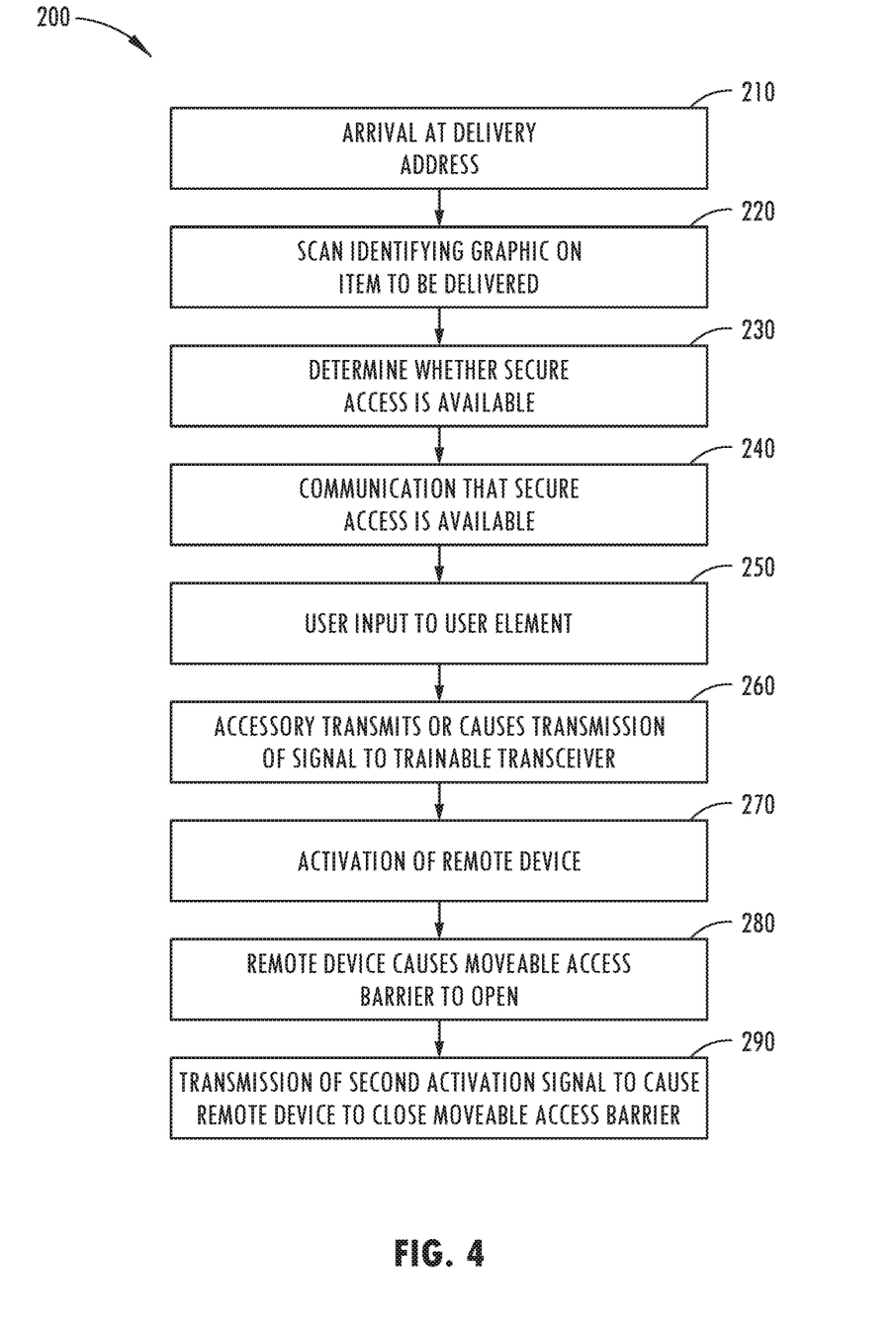
FIG. 4 illustrates a flow chart of a method of operating a first embodiment of the method in accordance with FIG. 1.

As shown in FIG. 4, a method for making a secure delivery is shown generally at 200. In operation, the method 200 may begin when a person or vehicle 140 making a delivery arrives at a delivery address, as shown in step 210. Mobile communications device 120 may be used to scan identifying graphic 142 disposed on the item to be delivered to the delivery address in step 220.

The program associated with mobile communications device 120 or remote server 152 may determine whether secure access to the desired area is available for that particular delivery in step 230. If it is determined that secure access is available, mobile communications device 120 or remote server 152 may be capable of communicating that to accessory 124. In some embodiments, the program may cause a message to be displayed on display element 156 of accessory 124 or on a display element 160 of mobile communications device 120 in step 240. The message may indicate whether secure access is available and/or may request a user input to initiate the rest of the process. In some embodiments, an input on user input element 144 of trainable transceiver 128 may be required for the initiation of the rest of the process in step 250.

Accessory 124 may be configured to, upon receipt of the information from mobile communications device 120 or remote server 152 transmit or cause the transmission of a signal to trainable transceiver 128 in step 260. Signal may contain activation information or an activation signal. Trainable transceiver 128 may then be configured to retrieve the appropriate activation signal from the memory of the program, accessory 124, or remote server 152, and to transmit the retrieved activation signal to remote device 132, causing the activation of remote device 132 in step 270. That, in turn, may cause moveable access barrier 136 to be opened, allowing access to the desired area in step 280.

In step 290, after the delivery has been made, trainable transceiver 128 may, upon receipt of an appropriate input or other predetermined event such as the passage of a specific amount of time, transmit an activation signal. The activation signal may again cause the activation of remote device 132, thus causing moveable access barrier 136 to close, thereby restricting access to desired area. The appropriate input may comprise, for example, a user input at trainable transceiver 128, a user input at the mobile communications device 120, and the like. In some embodiments, once moveable access barrier 136 has closed, the person or vehicle making the delivery may not be able to re-open moveable access barrier 136 unless another item having identifying graphic 142 associated with the particular remote device 132 is scanned.

Figure 5:
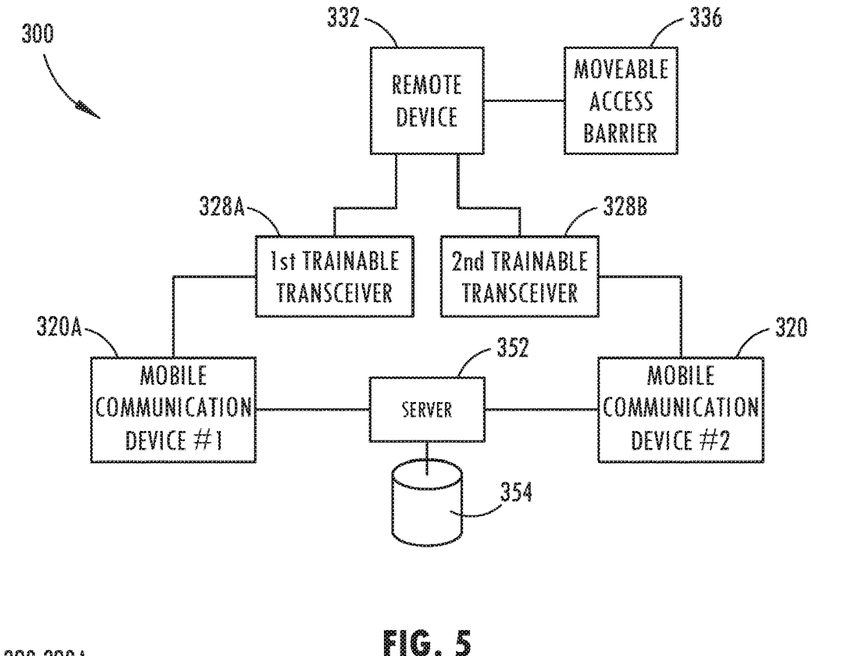
FIG. 5 is a diagram showing another embodiment of a secure delivery system.

FIG. 5 illustrates another embodiment of a secure delivery system 300 wherein secure delivery system 300 may comprise a trainable transceiver 328 disposed in a vehicle 140 used for making a delivery. A remotely-controlled moveable access barrier 336 may be configured to control access to a desired area at a delivery address. A remote device 332 capable of opening and closing moveable access barrier 336 may allow access to the desired area and may be selectively operable by trainable transceiver 328.

Figure 6:
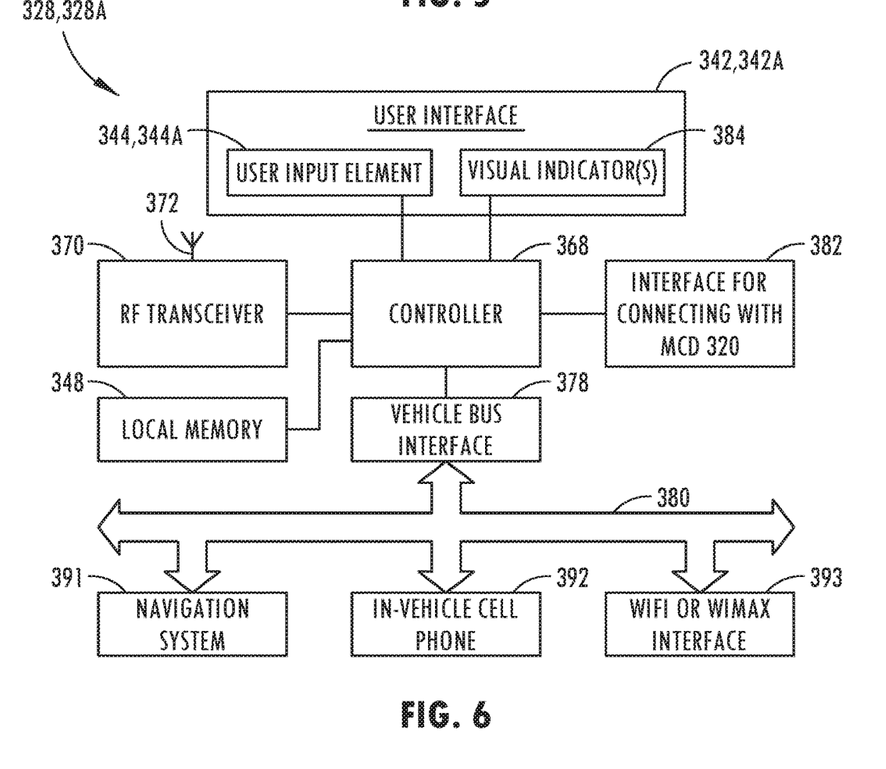
FIG. 6 is a block diagram showing a trainable transceiver in accordance with the systems of FIGS. 5 and 8.

In some embodiments, trainable transceiver 328 may be configured to communicate directly with remote device 332 by sending an activation signal directly to remote device 332. In some embodiments, trainable transceiver 328 may be configured to communicate with remote device 332 through the internet using an internet-connected mobile communications device 320 such as, for example, a smartphone, a tablet computer, or an in-vehicle internet connection. In some embodiments, trainable transceiver 328 may be configured to cause mobile communications device 320 to transmit or receive information from the internet. Trainable transceiver 328 may be configured to retrieve activation codes to transmit to remote device 332 from an account linked to remote device. In some embodiments, trainable transceiver 328 may comprise or be in communication with a user interface 342 having a user input element 344, as shown in FIG. 6. In some embodiments, trainable transceiver 328 may be configured to send an activation signal directly to remote device 332, thereby allowing trainable transceiver 328 to control moveable access barrier 336.

An owner of the account linked to remote device may have or have access to a second trainable transceiver 328A. Second trainable transceiver 328A may be capable of sending activation signals to remote device 332, thereby controlling moveable access barrier 336. Second trainable transceiver 328A may be configured to communicate through the internet using an internet-connected mobile communications device 320A such as a mobile phone or a tablet computer. Additionally or alternatively, second trainable transceiver may be capable of sending activation signals directly to remote device 332. Second trainable transceiver 328A may comprise or be associated with a user interface 342A having a user input element 344A. Second trainable transceiver 328A may be disposed within a vehicle.

In some embodiments, a recipient may create an account for storing information on a remote server or a cloud-based architecture, hereinafter referred to as remote server 352. Remote server may be accessible through the internet. The stored information may be capable of causing the activation of remote device 332 by trainable transceivers 328, 328A, thereby allowing trainable transceivers 328, 328A to control moveable access barrier 336.

When a delivery to a recipient's delivery address is scheduled, the item to be delivered may be linked to the recipient's remotely-accessible account. Trainable transceiver 328 in the vehicle 140 making the delivery may be capable of accessing and/or receiving some of the remotely stored account information, including the activation signal to operate the recipient's remote device 332. This may allow the person or vehicle 140 making the delivery to use trainable transceiver 328 to transmit an activation signal to remote device 332 to open and close moveable access barrier 336 so that the item to be delivered may be left in the desired area. In some embodiments, trainable transceiver 328 in the vehicle 140 making the delivery may only be allowed to access the recipient's account information to activate moveable access barrier 336 for a predetermined period of time or a predetermined time interval.

In some embodiments, trainable transceiver 328 may be capable of communicating information, such as an updated roll counter for an activation signal comprising a rolling code, back to remote server 352 for future deliveries. In some embodiments, trainable transceiver 328 may be configured to erase the recipient's account information from its memory once the delivery has been completed so that no unauthorized access can take place. This may be done after trainable transceiver 328 has communicated information to remote server 352. In some embodiments, there may be a time limit during which the recipient's account information is valid, after which it may be automatically erased.

To initiate the use of secure delivery system 300, the recipient may acquire the information, including the activation signal for remote device 332, needed to open moveable access barrier 336, and may cause that information to be transferred into the owner's remotely-accessible account. Such information is hereinafter referred to collectively as an activation signal. This may require a special trip by delivery service personnel to pair the recipient's account with the remote device 332 that controls moveable access barrier 336, or it may require the recipient to meet the delivery person at the delivery address the first time a package is delivered from that delivery service.

In some embodiments, the recipient may have a transmitter (not shown) that may be utilized by the delivery service to train trainable transceiver 328 and pair it to remote device 332. After pairing, trainable transceiver 328 device may be configured to upload training data to remote server 352 so that future deliveries would not require the presence of the recipient.

Remote server 352 may comprise or be configured to manage a remote memory device 354 in order to provide remote storage of the activation signal used to control remote device(s) 332. As described further below, trainable transceiver 328 in vehicle 140 used for the delivery may be configured to transfer information related to activation signals to remote server 352 for storage in remote memory device 354 and to retrieve the activation signals from storage in remote memory device 354 via the internet. In some embodiments, the activation signals may represent learned signal characteristics. In this manner, once the activation signal characteristics have been learned by trainable transceiver 328 and stored in a local memory 348 as an activation signal, the activation signal may be stored in remote memory device 354 for subsequent retrieval by trainable transceiver 328 of vehicle 140 making a delivery. Thus, the activation signal may be effectively remotely transferred from the owner's vehicle to a vehicle 140 making a delivery without requiring the vehicle 140 making the delivery to be near the delivery address or the recipient's vehicle.

FIG. 6 shows an example of a trainable transceiver 328, 328A that may be used in conjunction with secure delivery system 300. As shown, trainable transceiver 328, 328A may include a controller 368, a transceiver 370, an antenna 372, local memory 348, user interface 342, 342A including at least one user input element 344, 344A, a vehicle bus interface 378 connected to a vehicle bus 380, and an interface 382 for connecting with an internet-connected device such as mobile communications device 320. In some embodiments, interface 382 may comprise a Bluetooth transceiver. Trainable transceiver 328 may further include at least one visual indicator or display element 384. Although shown as separate components, transceiver 370 and interface 382 may be integrated or partially integrated to share components. Note that the same components shown in FIG. 6 may be used for both trainable transceivers 328, 328A or any other trainable transceivers used in secure delivery system 300. In some embodiments, transceiver 370 may comprise a radio frequency (RF) transceiver.

Controller 368 may comprise a microprocessor programmed to respond to inputs from various components. Controller 368 may be capable of controlling trainable transceiver 328, 328A to receive signals from and transmit signals to remote device 332. Such inputs may come from user input element 344, 344A or from various other components connected to vehicle bus 380 via bus interface 378 such as navigation system 391, an in-vehicle cell phone 392, or a Wi-Fi or Wi-Max interface 393.

Figure 7:
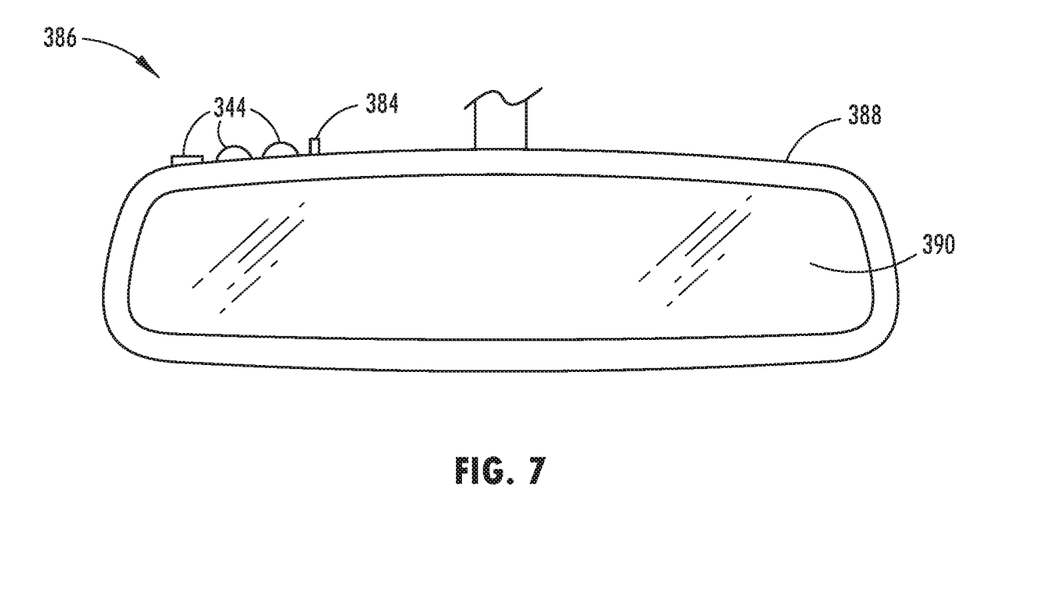
FIG. 7 is a front view of a rearview assembly incorporating the vehicle transceiver system of FIG. 6.

FIG. 7 shows an example of a rearview assembly 386 for vehicle 140 in which trainable transceiver 328 may be incorporated. Although shown in a rearview assembly 386, trainable transceiver 328 may be incorporated into various other vehicle components or locations within vehicle 140. Rearview assembly 386 may include a housing 388 for mounting to vehicle 140, and a rearview device 390 such as a rearview mirror element, a rearview display or both disposed in housing 388. Rearview assembly 386 may further include at least one user input element 344, such as a push button, capacitive touch sensor, or optical sensor and at least one visual indicator 384. The remaining components of trainable transceiver 328 may be housed within housing 388. When disposed in rearview assembly 386, controller 368 may be programmed to control components within rearview assembly 386 such as the reflectivity of an electro-optic mirror element, a display, map lights, a compass, an imager, and/or a headlamp control system.

In some embodiments, the activation signal for remote device 332 may be received through the internet by trainable transceiver 328 of vehicle 140 making the delivery only once vehicle 140 is within a first predetermined distance from the desired location. The location of vehicle 140 making the delivery may be determined using a global positioning system (GPS) source of either a navigation system 391 of vehicle 140 or the mobile communications device 320 if one is disposed within vehicle 140. In some embodiments, the delivery address may be entered into the navigation system of either vehicle 140 or mobile communications device 320. In some embodiments, the delivery address may be automatically entered from a delivery management system of the delivery service. In some embodiments, the delivery management system may be in communication with the remote server 352 holding information on the recipient's account, and may be capable of linking information regarding the delivery of the item to be delivered with the recipient's account.

Thus, the distance of vehicle 140 from the desired area may be determined and compared to a threshold to see if vehicle 140 is within a first predetermined distance from the desired area. This determination may be made by controller 368 or by mobile communications device 320. If controller 368 makes the determination that vehicle 140 is within a first predetermined distance from the desired area, then controller 368 may be configured to request mobile communications device 320 download the activation signal corresponding to the delivery address from remote memory device 354 and deliver the activation signal to controller 368 for storage in local memory 348. This may allow transceiver 370 to send a signal having the characteristics of the activation signal to remote device 332, thereby causing the opening of moveable access barrier 336 and allowing access to the desired area for the delivery.

In some embodiments, after placing the item to be delivered in the desired area, the person making the delivery may activate trainable transceiver 328 a second time, thereby causing it to send an activation signal and remote device to initiate the closing of moveable access barrier 336. Additionally or alternatively, in some embodiments, trainable transceiver 328 may be triggered to send the activation signal to cause the closing of moveable access barrier 336 automatically upon occurrence of an event, such as placing vehicle 140 in gear or driving a second predetermined distance from the desired area.

In some embodiments, after the delivery has been made and moveable access barrier 336 closed, the activation signal may be erased from local memory 348 so that the driver cannot later open moveable access barrier 336 without having a new delivery. The erasing of the activation signal may occur following one of the closing of moveable access barrier 336, after a predetermined time after opening or closing of moveable access barrier 336, the vehicle transmission being removed from a parking condition, and vehicle 140 reaching at least a second predetermined distance from the desired area. Additionally or alternatively, other security features may also be used such as allowing only a single activation of remote device 332 or only allowing transceiver 370 to transmit if transceiver 370 has a connection to the internet, may be employed. Regarding the latter feature, this would prevent trainable transceiver 328 from keeping a permanent usable copy of the activation signal if internet or GPS is quickly removed because trainable transceiver 328 may otherwise always think it is in proximity to moveable access barrier 336 (in the case of no GPS) or because it thinks it has legitimate access (in the case of no internet to disable it).

As an alternative to using location data to trigger the downloading and erasing of the activation signal from local memory 348 of trainable transceiver 328 of vehicle 140, the estimated delivery time may be used to establish a time window during which the activation signal will be downloadable and available for use by vehicle 140.

To implement the transfer of the activation signals between two trainable transceivers 328, 328A, depending upon the type of signal used to activate moveable access barrier 336, different types of data may need to be transferred. For example, the signal may have a fixed code or a rolling code. When a fixed code channel is copied to a trainable transceiver 328, the activation signal may be immediately usable by trainable transceiver 328.

In the case where moveable access barrier 336 responds to rolling codes, a rolling code counter may be used to activate moveable access barrier 336. For example, trainable transceiver 328A of the owner's vehicle may have a rolling counter value of X, which means after it activates moveable access barrier 336, trainable transceiver 328 of vehicle 140 making a delivery would have to have a rolling counter of X+1, which would ordinary be difficult to accomplish. However, using the cloud-based secure delivery system 300 described herein, the activation signal including the rolling counter may be uploaded from trainable transceiver 328 to remote server 352 after each activation and subsequently downloaded from remote server 352 for use by trainable transceiver 328, and vice versa. This may ensure that the most recently used rolling counter may be updated to ensure that both trainable transceivers 328, 328A are transmitting rolling code counters within the acceptance window of moveable access barrier 336.

Regardless of whether moveable access barrier 336 responds to a fixed or rolling code, certain signal characteristic data will typically be stored in local memory 348 and thus be subject to transfer. Such signal characteristic data may include type, manufacturer, modulation, frequency, first level, along with the activation code. The signal characteristic data may further include frequency deviation if the signal is frequency modulated. Signal characteristic data incorporated in the activation signal may also include pulse timing and pulse sequence in the event a fixed code is used. Other signal characteristic data incorporated in the activation signal may include serial number, rolling counter, function code, and any other data necessary to replicate the message in an RF signal that in turn will activate moveable access barrier 336.

Figure 8:
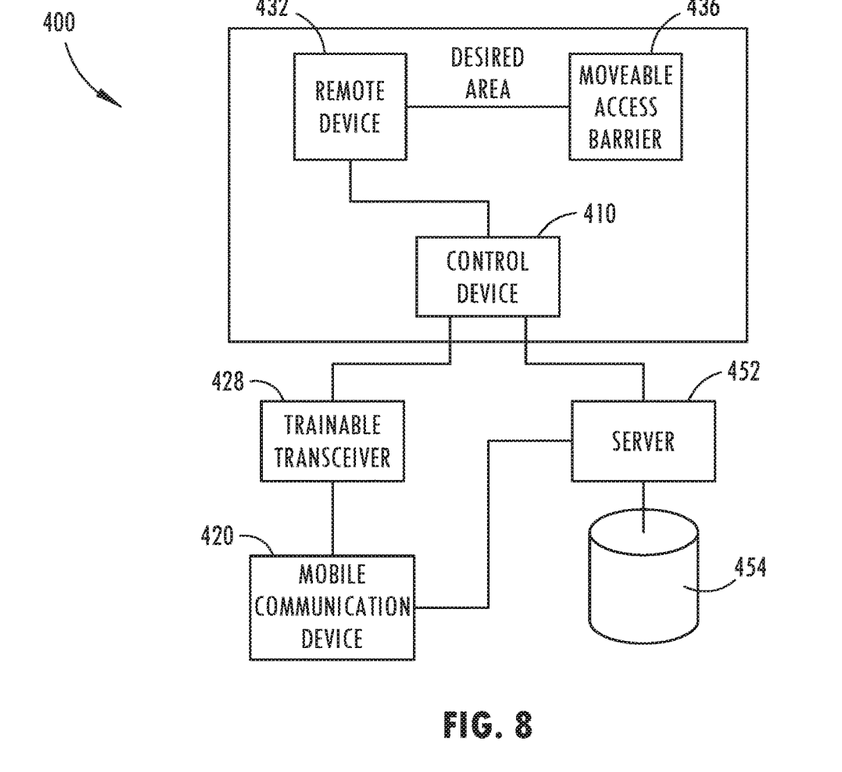
FIG. 8 is a diagram showing yet another embodiment of a secure delivery system.
Figure 9:
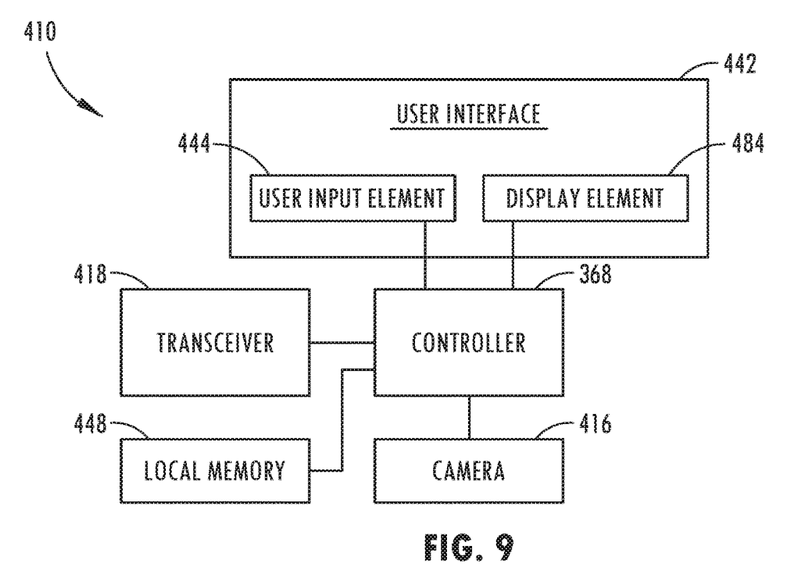
FIG. 9 is a block diagram showing a remote device in accordance with some embodiments of the system of FIG. 8.

In a further embodiment, a secure delivery system 400 shown in FIG. 8 may comprise a control device 410. Control device 410 may be disposed in the desired area of a recipient. As shown in FIG. 9, control device 410 may comprise a controller 468, a transceiver 418, a user interface 442 having at least one user input element 444 and an optional display element 484, and an optional camera 416. Control device 410 may be configured to communicate with a moveable access barrier 436 wirelessly, and may be used in a stand-alone manner if desired. Control device 410 may also communicate via BLUETOOTH® with a program that stores the owner's account information in a remote server 452. Additionally or alternatively, control device may communicate with remote server 452 via a Wi-Fi connection. Control device may be configured to communicate with a trainable transceiver 428 located in a vehicle 440 making a delivery.

The at least one user input element 344 of control device 410 may allow the training of control device 410, the manual transmission of the activation signal to moveable access barrier 436, and turning control device 410 on and off. Optional camera 416 may be mounted in control device 410 for capturing video images during the time that the delivery is taking place. Control device 410 may be configured to notify the recipient when moveable access barrier 436 is opened or closed and to stream the video to the recipient. Control device 410 may be universal for each subscribing delivery service.

In some embodiments, once the recipient has trained control device 410 to a transmitter configured to activate the operation of moveable access barrier and paired control device 410 to a remote device 432 configured to operate the recipient's moveable access barrier 436, an identifier corresponding to remote device 432 may be stored in the owner's account in a remote memory device 454 in a remote server 452. When the recipient is expecting a delivery, a program may be used to grant access to the delivery service (e.g., FedEx, Walmart, UPS, Amazon, etc.) for a particular time frame.

When vehicle 440 making the delivery reaches the delivery address, trainable transceiver 428 of vehicle 440 may be configured to communicate with control device 410 disposed in the recipient's desired area, either through remote server 452 or directly through a wireless protocol. Upon receipt of a communication from trainable transceiver 428, control device 410 may send a transmission, such as an activation signal, to remote device to have it open or close moveable access barrier 436. The communication sent from trainable transceiver 428 to control device 410 may include a vehicle identifier or identifier for that particular delivery, and this combined with a date stamp can be used to ensure vehicle 440 no longer has access to the desired area after the delivery has been made.

Optional camera 416 in control device 410 may be configured to capture selected images of the delivery. This may allow recipients to ensure that deliveries have been completed, that nothing was disturbed in the desired area, and that moveable access barrier 436 was closed after the completion of the delivery. Secure delivery system 400 may also be configured to alert the recipient that the delivery took place.

In some embodiments, control device 410 may include a trainable transceiver 428 and may be trained to learn the activation signal of a transmitter associated with moveable access barrier 436. Control device 410 may be further configured to store the activation signal in a local memory 448 of control device 410 such that it may send wireless signals to moveable access barrier 436, causing moveable access barrier 436 to open or close. Control device 410 may be responsive to a received activation signal that is different from the signal to which moveable access barrier 436 responds. When such an activation signal is received, control device 410 may then transmit an activation signal to moveable access barrier 436, causing moveable access barrier 436 to open or close. The activation signal may have a fixed frequency (e.g., 915 MHz) across all similar devices so that the additional trainable transceivers 428 of vehicles 440 may be constructed to only have to transmit at that frequency. Thus, only an identification code associated with control device 410 may need to be temporarily transferred to a second trainable transceiver 428 for them to effectively communicate with control device 410.

Control device 410 may be capable of being in communication with the internet via Wi-Fi or through a program via BLUETOOTH® or a similar structure. In this way, control device 410 may transfer the identification code associated with control device 410 through the internet for storage by remote server 452 in remote memory device 454 so that it can be retrieved by a second trainable transceiver 428 of a second vehicle 440 when triggered to do so in a manner similar to that described above. The identification code may also be erased upon a triggering event such as the passage of a predetermined amount of time, the closing of moveable access barrier 436, the vehicle reaching at least a predetermined distance from the desired area, and the like.

The activation signal stored in remote memory device 454 may be managed using a program on an internet-connected device such as a smartphone. For example, one may access remote server 452 using a program on mobile communications device 420 and send a command to remote server 452 to transfer the activation signal stored in remote server 352 to a particular trainable transceiver 428. Program may include unique identification information for the particular trainable transceiver 428 so that remote server 452 may look up the encryption key used by the particular trainable transceiver 428 as well as an IP address for the particular trainable transceiver 428. Remote server 452 may then transfer the requested activation signal to the particular trainable transceiver 428.

In some embodiments, control device 410 may be configured to be placed outside the desired area. User interface 442 may comprise a keypad such as those often used for door entry. Control device 410 may be connected to Wi-Fi and may allow the person or vehicle making the delivery to access the desired area with a temporary passcode tied to the delivery. The temporary passcode may be configured to cause control device 410 to transmit the activation signal to moveable access barrier 436 to cause it to open. The temporary passcode may be unique to the delivery and may be temporarily downloaded to control device 410 through the internet for limited usage and/or for a limited time period such as the estimated delivery time window. This approach may avoid the need to have trainable transceivers 428 in each delivery vehicle 440 as the temporary passcode may be accessed via an internet-connected device or a mobile communications device such as a smartphone and may be identified based on proximity of the smartphone to the delivery address.

Although some remote devices 432 are capable of connecting to Wi-Fi and thus may be controlled directing through an internet-connected device such as a smartphone or computer, not all remote devices have this capability. However, by using an internet-connected device, one may communicate with remote server 452, which may then transmit a command to a trainable transceiver 428 located near the desired area. Such a command may be for trainable transceiver 428 to send a signal to remote device 432 to open or close moveable access barrier 436 or to determine the status of moveable access barrier 436, e.g., whether moveable access barrier 436 is open or closed, and return the status information to the internet-connected device.

Although trainable transceiver 428 may be described as being integrated into vehicles 440, trainable transceiver 428 may instead may be a handheld device that may or may not be associated with any particular vehicle. Further, although the embodiments above have described the data to be transferred as activation signal, other forms of data may be transferred.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

In this document, relational terms, such as first and second, top and bottom, front and back, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. In the drawings, the depicted structural elements are not to scale and certain components are enlarged relative to the other components for purposes of emphasis and understanding.

What is claimed is:

1. A system for allowing access to a desired area where access to the desired area is through a remotely-controllable moveable access barrier, the system comprising:
   a remote device that allows access into the desired area in response to an activation signal uniquely associated with the remote device;
   a remote server configured to store characteristics of the activation signal;
   a trainable transceiver comprising:
      a local memory;
      an interface through which communication with the remote server is provided;
      a controller in communication with the local memory and the interface, the controller configured to receive the activation signal from the remote server through the interface and to store the activation signal in the local memory; and
a transceiver configured to transmit the activation signal to the remote device where the transmitted activation signal includes signal characteristics stored in the local memory;
wherein the remote device is a garage door opener, the moveable access barrier is a garage door capable of being opened and closed by the garage door opener, and the remote device is configured to open and close the garage door; and
wherein the garage door opener may be configured to allow access through the garage door by opening the garage door in response to receiving an activation signal having characteristics uniquely associated with the garage door opener.

2. The system of claim 1, wherein the activation signal is not received until the trainable transceiver is within a first predetermined distance from the desired area.

3. The system of claim 2, wherein the controller is configured to erase the activation signal from the local memory when the trainable transceiver is more than a second predetermined distance from the desired area.

4. The system of claim 2, wherein the controller is configured to erase the activation signal from the local memory at a predetermined time after initially transmitting the activation signal to the remote device.

5. The system of claim 1, wherein the activation signal characteristics are not received from the remote server until a beginning of an estimated delivery time window.

6. The system of claim 5, wherein the controller is configured to erase the activation signal from the local memory at an end of the estimated delivery time window.

7. A system for allowing temporary access to a desired area, where access to the desired area is through a remotely-controllable moveable access barrier, the system comprising:
a remote device that allows access through the moveable access barrier in response to an activation signal having characteristics uniquely associated with the remote device;
a control device located in proximity to the desired area for transferring the activation signal to the remote device to allow access through the moveable access barrier in response to the receipt of an activation signal, the activation signal having an identification code uniquely associated with a particular delivery;
a remote server configured to store the identification code;
a trainable transceiver comprising:
a local memory;
an interface through which communication with the remote server is provided;
a controller in communication with the local memory and the interface, the controller configured to receive the identification code from the remote server through the interface and to store the identification code in the local memory; and
a trainable transceiver configured to transmit the activation signal to the remote device where the transmitted activation signal includes the identification code stored in the local memory;
wherein the remote device is a garage door opener and the moveable access barrier is a garage door that is opened and closed by the garage door opener; and
wherein the garage door opener is configured to allow access through the garage door by opening the garage door in response to an activation signal having characteristics uniquely associated with the garage door opener.

8. The system of claim 7, wherein the identification code is received only after the trainable transceiver is within a first predetermined distance from the desired area.

9. The system of claim 8, wherein the controller is configured to erase the identification code from the local memory when the trainable transceiver is more than a second predetermined distance from the desired area.

10. The system of claim 8, wherein the controller is configured to erase the identification code from the local memory at a predetermined time after initially transmitting the activation signal to the control device.

11. The system of claim 8, wherein the control device includes a camera capable of capturing images.

12. A system for allowing temporary access to a desired area, where access to the desired area is through a remotely-controllable moveable access barrier, the system comprising:
a remote device that allows access through the moveable access barrier in response to an activation signal having characteristics uniquely associated with the remote device;
a control device located in proximity to the desired area for transmitting the activation signal to the remote device to allows access through the moveable access barrier in response to entry by a user of a passcode; and
a remote server configured to store the passcode;
wherein the control device is in communication with the remote server so as to temporarily download the passcode and store the passcode in a local memory;
wherein the remote device is a garage door opener and the moveable access barrier is a garage door that is opened and closed by the garage door opener; and
wherein the garage door opener is configured to allow access through the garage door by opening the garage door in response to an activation signal having characteristics uniquely associated with the garage door opener.

13. The system of claim 12, wherein the passcode is downloaded and stored in the local memory during an estimated delivery time window.

14. The system of claim 12, wherein the passcode is associated with a particular delivery to be made to the desired area.

* * * * *